United States Patent [19]
Willy

[11] 3,753,051
[45] Aug. 14, 1973

[54] ELECTROLYTIC CAPACITOR HAVING LOW VALUE INDUCTANCE AND EQUIVALENT SERIES RESISTANCE
[75] Inventor: John Robert Willy, Easley, S.C.
[73] Assignee: Sangamo Electric Company, Springfield, Ill.
[22] Filed: May 1, 1972
[21] Appl. No.: 249,394

[52] U.S. Cl. .............................. 317/230, 317/261
[51] Int. Cl. .......................................... H01g 9/00
[58] Field of Search .................................... 317/230

[56] References Cited
UNITED STATES PATENTS
| 1,880,263 | 10/1932 | Lilienfeld | 317/230 |
| 3,386,014 | 5/1968 | Burger et al. | 317/230 |
| 3,491,270 | 1/1970 | Gabriel et al. | 317/230 |
| 3,654,524 | 4/1972 | Puppolo et al. | 317/230 |
| 3,670,210 | 6/1972 | Blase | 317/230 |
| 3,686,535 | 8/1972 | Piper | 317/230 |

Primary Examiner—John W. Huckert
Assistant Examiner—Joseph E. Clawson, Jr.
Attorney—John A. Dienner, Arthur J. Wagner et al.

[57] ABSTRACT

An electrolytic capacitor assembled in an elongated container in which a conductive arbor is axially disposed. The ends of the conductive arbor are electrically insulated from the end covers of the container and a conductive plate is secured crosswise to the conductive arbor to divide its interior into two chambers. Capacitor sections are wound around the arbor on either side of the conductive plate with the anode foil making parallel electrical contacts with the conductive plate and the cathode foil making parallel electrical contacts with the end covers.

10 Claims, 4 Drawing Figures

PATENTED AUG 14 1973 3,753,051
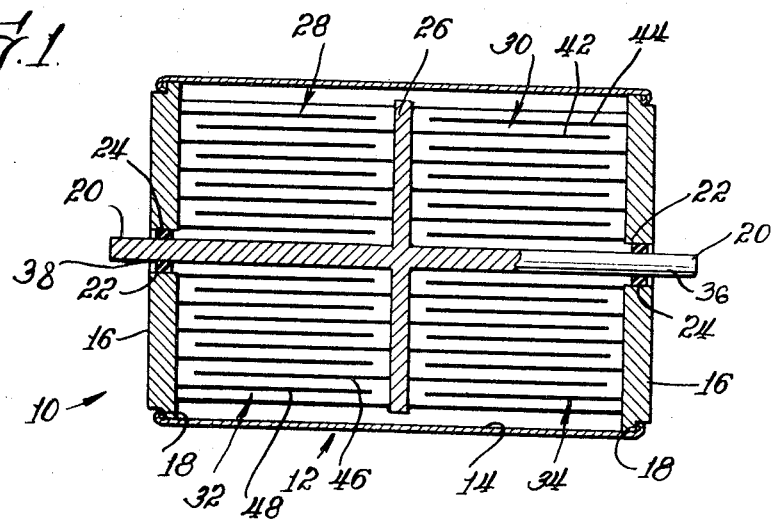
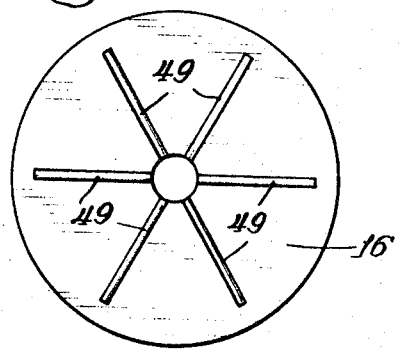
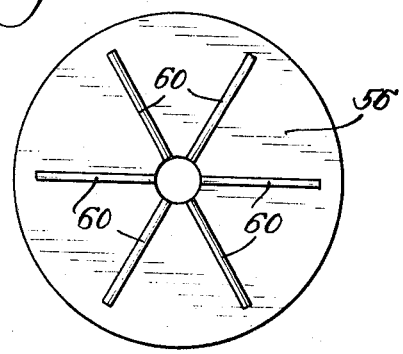
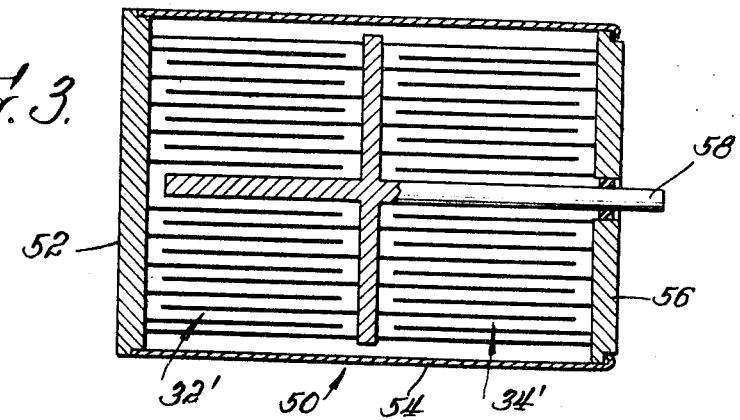

ELECTROLYTIC CAPACITOR HAVING LOW VALUE INDUCTANCE AND EQUIVALENT SERIES RESISTANCE

BACKGROUND OF THE INVENTION

This invention relates to electrolytic capacitors, and in particular, to electrolytic capacitors having low values of self-inductance and equivalent series resistance.

One of the most difficult design objectives for electrolytic capacitors is to minimize the values of self-inductance and equivalent series resistance. In forming the conventional tubular construction of electrolytic capacitors, large values of self-inductance result by reason of the method used in winding the capacitor section, tabbing the section, and bringing the tabs from the section to the terminals.

In circuits in which frequencies of over 10 KHz are experienced, the capacitive reactance decreases and the inductive reactance increases, and the device operates more as a combination of inductive and resistance components (rather than as a capacitor). In certain applications, as for example in computer equipment in which a requirement for the provision of high speed and/or high frequency power pulses may be present, the tendency of the conventional capacitor to act as an inductance at higher frequencies (i.e., above 10 KHz for example) makes it difficult to provide such power pulses at the required speeds. It is an object of the present application therefore to provide a capacitor which continues to act as a capacitor at frequencies above 10 KHz.

A further object of this invention is to provide a capacitor constructed to have a smaller value of self-inductance and equivalent series resistance than heretofore possible and in turn provide a capacitor of reduced impedance at high frequencies.

Another object of this invention is to provide a capacitor with multiple short conducting paths to give the minimum value of self-inductance and equivalent series resistance.

A still further object of this invention is to provide an electrolytic capacitor having greatly reduced values of self-inductance and equivalent series resistance, which is easy to manufacture and very reliable in operation.

It is another object of this invention to provide a capacitor in which improved heat transfer is effected from the capacitor interior by means of heat conducting disc and axial heat conducting rod in thermal contact with the conductor foils of the capacitor.

Yet another feature of the present invention is the significant increase in the Q value of the electrolytic capacitor in which the Q value increase fundamentally results from the lowering or decreasing of the value of the equivalent series resistance in such structure.

SUMMARY OF THE INVENTION

An electrolytic capacitor constructed in accordance with the principles of this invention comprises a plurality of short length capacitor sections arranged coaxially to provide multiple short conducting paths for minimizing the values of self-inductance and equivalent series resistance, and at the same time provides a structure with improved heat transfer characteristics.

DESCRIPTION OF DRAWINGS

The invention will be explained hereinafter in detail with reference to the accompanying drawing, wherein:

FIG. 1 is a cross sectional view taken along the longitudinal axis of the first embodiment of my invention;

FIG. 2 illustrates the inside surface of one of the end covers of the first embodiment;

FIG. 3 is a cross sectional view taken along the longitudinal axis of the second embodiment of my invention; and FIG. 4 illustrates the inside surface of one of the end covers of the second embodiment.

FIRST EMBODIMENT

Referring to FIGS. 1 and 2, there is shown an electrolytic capacitor embodying the principles of this invention and generally designated by the reference numeral 10. The electrolytic capacitor 10 is housed in a cylindrical container 12 comprising a cylindrical metal shell 14 and a pair of metal end covers 16. The end covers 16 are locked in place by crimping the ends of the shell 14 over the annular shoulder 18 formed at the peripheral edge of the end covers 16, and then welding or otherwise sealing the end cover with shell 14.

A conductive arbor 20, in the form of a circular rod, extends along the axis of container 12 with its ends projecting through apertures 22 formed centrally of the end covers 16. The diameter of opening or aperture 22 is larger than the diameter of the conductive rod, and an electrically insulative and sealing plug 24 is secured in aperture 22 for electrically insulating conductive arbor 20 from the end caps 16. In the disclosed embodiment a conductive plate or disc 26 is disposed crosswise on the conductive rod 20 at its approximate midlength in electrical and thermal contact therewith. Disc 26 divides the interior of the capacitor container 12 into two chambers 28 and 30 of substantially equal volume. It is within the intended scope of this invention that the disc 26 be located at other positions on conductive rod 20 to provide chambers of unequal volume.

Two circular convolutely wound capacitor sections 32 and 34 are provided in the chambers 28 and 30 by helically winding capacitor bands or foils about the conductive rod portions 36 and 38, respectively. The anode foil 42 of the capacitor section 32 makes several parallel electrical contacts per revolution of winding with the anode contact electrode or disc 26. Similarly, the cathode foil 44 of capacitor section 32, which is separated from the anode electrode by suitable serarators (not shown) such as Kraft paper and the like, makes several electrical contacts per revolution of winding to the cathode contact electrode or end cover 16. The other capacitor section 34 has an identical construction, where its anode foil 46 makes parallel electrical contact with anode disc 26 and cathode foil 48 makes several parallel contacts with cathode disc or end cover 16.

To ensure there is good electrical contact between the ends of the cathode and anode foils and the end covers and conductive disc, the inside surface of the two end covers is provided with a plurality of radial ridges or ribs, as radial ribs 49 shown in FIG. 2, and both flat surfaces (not shown) of disc 26 have similar radial ribs. When the end covers 16 are pressed inwardly the ends of the foils deform about these radial ridges to provide good electrical contact. Alternatively, the ridges could be formed in other geometrical patterns such as concentric circles or a plurality of diagonal parallel lines.

As noted heretofore the reduced value of inductance and equivalent series resistance in the novel capacitor is fundamentally achieved by providing a plurality of short conducting paths. Thus with reference to FIG. 1, the path through the first section 30 of the capacitor can be traced from end plate 16 (— cathode) over each of the points of intersection of the ribs 49 on end plate 16 with the adjacent ends of the spirally wound cathode 34. Thus, each layer of the cathode winding forms a path from the point of intersection along its length in the direction of the center disc 26. As noted above, each layer of the cathode winding is spaced from an adjacent anode winding by conventional separators which are impregnated with an electrolyte. Each of the multiple paths therefor continues from the cathode layer over the electrolyte to the oxide on the adjacent anode layer which, in turn, provides plural multiple paths to the center electrode 26, the paths extending over the intersections of the anode layers with the rib members on the center disc to center element 24 (+ anode). The second section 28 of the capacitor is similarly constructed.

It is apparent therefrom that in addition to providing multiple paths, the length of each of the multiple paths is reduced to thereby decrease the inductance of the capacitor section. In addition the reduced inductance of the device comprises inductance which is connected in parallel to thereby further reduce the self-inductance of the capacitors. Reduction of the self-inductance and equivalent series resistance with such structure, of course, results in a decreased capacitor impedance at the higher frequencies.

SECOND EMBODIMENT

The second embodiment illustrated in FIGS. 3 and 4 is very similar to the construction shown in FIGS. 1 and 2, except that the center conductive arbor projects through only one of the end covers. For simplicity of description, like parts to those shown in the first embodiment are designated by prime reference numerals.

In the second embodiment, the capacitor container 50 is formed as an open ended cylinder having an end wall 52 and cylindrical side wall 54. After the capacitor sections are assembled into the casing, the end cover or disc 56 is locked into place by crimping the outer ends of side walls 54 over the peripheral edge of the end cover, and then is welded or sealed as in the first embodiment. The conductive rod 58 is identical to conductive rod 20 except that its length is made shorter to terminate before engagement with end wall 52. The two capacitor sections 32' and 34' are formed identically on the conductive rod and have the same electrical characteristics. The only structural difference between the first and second embodiments is that the anode connection can only be made at one end in the second embodiment rather than the two ends shown in the first embodiment. Radial ribs 60 are also provided on the inside surfaces of the end covers.

Both embodiments provide a further advantage over the prior art in that the use of the central conductive rod and the use of the three conductive discs in thermal contact with the conductive foils provide very rapid transfer of heat from the inside of the capacitor to the outside. This feature of increased ability to dissipate heat generated within the capacitor is extremely valuable in increasing the "ripple current" rating of the capacitor since the ripple current rating is associated with the capacitor's ability to dissipate internally generated heat. To further enhance the capacitor's heat transfer capabilities, the anode conductive rod and end disc covers could be placed in direct contact with heavy buss bars or other known heat sink arrangements.

Capacitors constructed in accordance with the principles of my invention have demonstrated greatly reduced values of self-inductance and equivalent series resistance, particularly for frequencies above 10 KHz. This advantage arises primarily from the use of multiple short conducting paths which reduce the value of self-inductance and equivalent series resistance.

One successful embodiment of the novel capacitor is contained in a casing 3 inches in diameter and 3½ inches long, and the measurements of such unit were 74,500 MFD, 13.2 percent DF, and an equivalent series resistance of 0.00235 ohms at 120 Hz. The impedance of the unit at 10 KHz measured 0.0013 ohms and at 100 KHz the impedance measured 0.00072 ohms.

I claim:

1. An electrolytic capacitor having relatively low values of inductance and effective series resistance comprising a container, a pair of conductive covers closing the ends of said container, conductive plate supported in said container generally crosswise to its length, first and second conductive arbor means extending perpendicular from the opposite sides of said conductive plate, at least one of said arbor means extending out through an electrically insulated opening in one of said covers, and first and second capacitor sections wound respectively on said first and second arbor means, each of said capacitor sections comprising an anode foil convolutely wound on said arbor means making parallel electrical contacts in each convolute of said winding with a plurality of points on one of said conductive plate or the conductive cover at the end of said container and a cathode foil convolutely wound with said anode on said arbor means making parallel electrical contact with a plurality of points in each convolute of said winding with the other of said conductive plate or said conductive cover whereby a plurality of parallel paths are established by the anode and cathode foils in each section of the capacitor.

2. An electrolytic capacitor as defined in claim 1, wherein the other of said conductive arbor means extends outwardly of said container through an electrically insulated opening in the other of said covers.

3. An electrolytic capacitor as defined in claim 1, wherein said first and second arbor means are disposed coaxially.

4. An electrolytic capacitor having relatively low values of inductance and effective series resistance comprising a cylindrical container, a pair of conductive covers closing the ends of said container, a conductive arbor extending axially through said container and through an electrical insulative opening in one of said conductive covers, a conductive plate supported generally crosswise on said arbor intermediate its length, and capacitor sections convolutely wound around said arbor on both sides of said conductive plate, each of said capacitor sections comprising an anode foil making a plurality of parallel electrical contacts with one of said conductive plate or the conductive cover at one end of said container and a cathode foil making a plurality of parallel electrical contacts with the other of said conductive plate or said conductive cover.

5. An electrolytic capacitor as defined in claim 4, wherein said conductive arbor extends through an electrical insulative opening in the other of said conductive covers.

6. An electrolytic capacitor as defined in claim 4, wherein said conductive covers and said conductive arbor have good heat transfer characteristics.

7. An electrolytic capacitor as defined in claim 4, wherein said conductive plate comprises a circular disc formed integrally on said conductive arbor.

8. An electrolytic capacitor as defined in claim 4, wherein a plurality of ridges are provided on the inside surface of said conductive covers and on both end surfaces of said conductive plate for ensuring good electrical contact with said anode and cathode foils.

9. An electrolytic capacitor having relatively low values of inductance and effective series resistance comprising a container having first and second arbor means and a first and a second capacitor section disposed with said container wound respectively on said first and second arbor means, each of which capacitor sections comprises an anode foil and a cathode foil convolutely wound on its associated arbor means, a first conductive member connected to multiple points on said anode foil of said first and said second sections, and a second electrical conductive member connected to multiple points of said cathode foils of said first and second sections, whereby multiple parallel paths are established by the anode and cathode foils in each section of said capacitor.

10. An electrolytic capacitor having relatively low values of inductance and effective series resistance comprising a container having a conducting core member, first and second capacitor sections wound on said core member and disposed within said container in coaxial relationship, each of which capacitor sections comprises an anode foil and a cathode foil convolutely wound of said common core member, a first conductive member connected common to multiple points on only said anode foil of said first and said second sections to provide a first terminal for said capacitor, and a second electrical conductive member connected common to multiple points on only said cathode foils of said first and second sections to provide a second terminal for said capacitor whereby multiple paths are established for the anode and cathode foil in each section of said capacitor.

* * * * *